(12) United States Patent
Frederick et al.

(10) Patent No.: US 10,969,011 B2
(45) Date of Patent: Apr. 6, 2021

(54) METHOD AND SYSTEM FOR DISENGAGING PARKING PAWL IN HYBRID TRANSMISSION

(71) Applicant: Ford Global Technologies, LLC, Dearborn, MI (US)

(72) Inventors: Kenneth Frederick, Dearborn, MI (US); Robert Hurley, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 16/394,719

(22) Filed: Apr. 25, 2019

(65) Prior Publication Data

US 2020/0340580 A1    Oct. 29, 2020

(51) Int. Cl.
*B60W 10/18* (2012.01)
*F16H 63/34* (2006.01)
*B60W 10/196* (2012.01)

(52) U.S. Cl.
CPC ....... *F16H 63/3466* (2013.01); *B60W 10/182* (2013.01); *B60W 10/196* (2013.01); *F16H 63/3425* (2013.01)

(58) Field of Classification Search
CPC ............ F16H 63/3466; F16H 63/3425; B60W 10/196; B60W 10/182
See application file for complete search history.

(56) References Cited

U.S. PATENT DOCUMENTS

| 6,279,713 | B1 | 8/2001 | Young et al. |
| 7,757,832 | B2 | 7/2010 | Sauter et al. |
| 9,995,390 | B2* | 6/2018 | Al-Regib ............... B60T 1/005 |
| 10,527,159 | B2* | 1/2020 | Takeuchi ............... B60L 58/12 |
| 2017/0155214 | A1* | 6/2017 | Shen .................. H01R 13/6666 |
| 2018/0363755 | A1* | 12/2018 | Wakui .................. F16H 57/025 |
| 2019/0047570 | A1* | 2/2019 | Iwanaka ................ F02D 29/02 |

FOREIGN PATENT DOCUMENTS

DE           10245951 A1    4/2004

* cited by examiner

*Primary Examiner* — David J Hlavka
(74) *Attorney, Agent, or Firm* — David B. Kelley; Brooks Kushman P.C.

(57) ABSTRACT

A vehicle includes a transmission having an electric machine, a park ring fixedly coupled to the electric machine, and a parking pawl engageable with the park ring to hold the park ring stationary when the transmission is in PARK. A vehicle is programmed to, responsive to a request to shift from PARK, command disengagement of the parking pawl and concurrently command a torque to the electric machine to counteract driveline torque on the park ring.

19 Claims, 3 Drawing Sheets

METHOD AND SYSTEM FOR DISENGAGING PARKING PAWL IN HYBRID TRANSMISSION

TECHNICAL FIELD

The present disclosure relates to hybrid transmissions and more specifically to methods and systems for quietly disengaging a parking pawl.

BACKGROUND

Vehicles such as battery-electric vehicles (BEVs), plug-in hybrid electric vehicles (PHEVs), and fully hybrid-electric vehicles (FHEVs) contain a traction battery assembly to act as an energy source for one or more electric machines. The traction battery includes components and systems to assist in managing vehicle performance and operations. A power inverter is electrically connected between the battery and the electric machines to convert direct current coming from the battery into alternating current compatible with the electric machines. The power inverter may also act as a rectifier to convert alternating current from the electric machines to direct current compatible with the battery.

Vehicles with automatic transmissions include a parking pawl configured to prevent rolling of the vehicle when the transmission is in PARK. The parking pawl is typically grounded to a housing of the transmission and engageable with a park ring fixed to a transmission shaft. The pawl locks the transmission when the pawl is engaged with the park ring to prevent rolling of the vehicle.

SUMMARY

According to one embodiment, a vehicle includes a transmission having an electric machine, a park ring fixedly coupled to the electric machine, and a parking pawl engageable with the park ring to hold the park ring stationary when the transmission is in PARK. A vehicle is programmed to, responsive to a request to shift from PARK, command disengagement of the parking pawl and concurrently command a torque to the electric machine to counteract driveline torque on the park ring.

According to another embodiment, a vehicle includes a transmission having a housing, an electric machine disposed in the housing and including a rotor, a park ring fixedly coupled to the electric machine such that rotation of the rotor rotates the park gear, and a parking pawl attached to the housing and configured to engage with the park ring to rotationally fix the park ring to the housing when the transmission is in PARK. The vehicle further includes an accelerometer configured to output a signal indicting pitch of the vehicle and a controller. The controller is programmed to, responsive to a request to shift the transmission from PARK and the pitch of the vehicle being beyond a threshold, (i) command a torque to the electric machine having a magnitude and a direction based on the pitch and (ii) command disengagement of the parking pawl from the park ring while the torque is applied.

According to yet another embodiment, a method of disengaging a parking pawl from a park ring in a transmission having an electric machine includes, responsive to the transmission being shifted from PARK and a pitch of a vehicle exceeding an inclination threshold, concurrently commanding the electric machine to rotate in a first direction with a first torque having a magnitude based on the pitch and disengagement of a parking pawl from the park ring. The method further includes, responsive to the transmission being shifted from PARK and the pitch of the vehicle exceeding a declination threshold, concurrently commanding the electric machine to rotate in a second direction with a second torque having a magnitude based on the pitch and disengagement of the parking pawl from the park ring.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
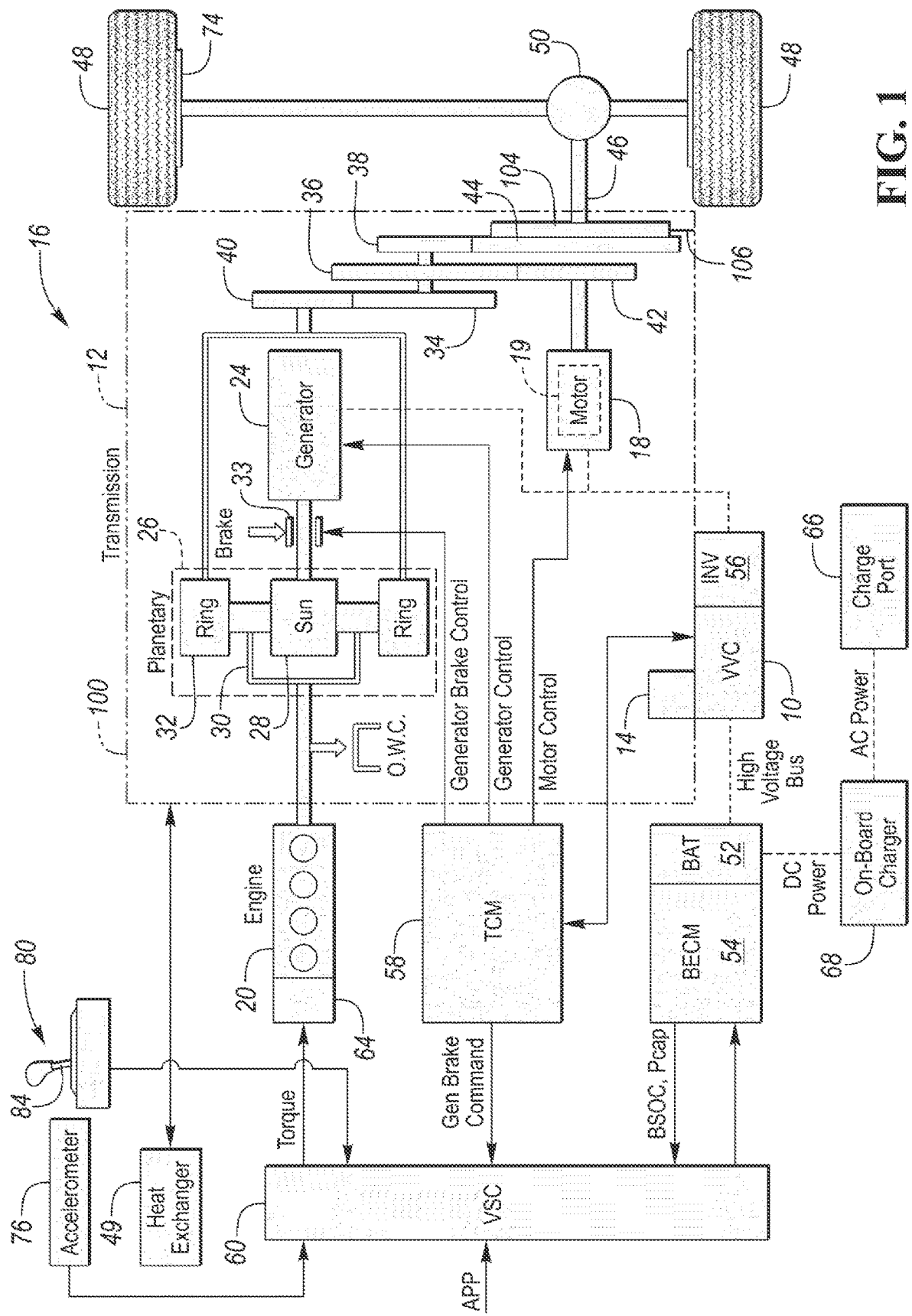
FIG. 1 is a schematic diagram of an example hybrid vehicle.

An example of a PHEV is depicted in FIG. 1 and referred to generally as a vehicle 16. The vehicle 16 includes a transmission 12 and is propelled by at least one electric machine 18 with assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear set 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear set 26 combines the generator torque and the engine torque and provides a combined output torque about the ring gear 32. The planetary gear set 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction, e.g., counterclockwise. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18 that is connected to the rotor 19. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

The vehicle controllers, including the VSC 60, BECM 54, the ECM 64, and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 also receives input (APP) that represents an accelerator pedal position. The VSC 60 provides output that represents a desired wheel torque, desired engine speed, and generator brake command to the TCM 58; and contactor control to the BECM 54. The collection of vehicle controllers, including the VSC 60, BECM 54, EMC 64, and the TCM 58, may be referred to as the controller.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the inverter 56 may be implemented on other types of electric vehicles, such as a HEV or a BEV.

The vehicle 16 may include an anti-lock braking system (ABS). The ABS may include a brake module and a plurality of friction brakes 74 located at each of the wheels. Modern vehicles typically have disc brakes; however, other types of friction brakes are available such as drum brakes. Each of the brakes 74 are in fluid communication with the brake module via a brake line configured to deliver fluid pressure from the module to a caliper of the brake 74. The module may include a plurality of valves configured to provide independent fluid pressure to each of the brakes 74. The brake module may be controlled by operation of a brake pedal and/or by the vehicle controller without input from the driver. The ABS system also includes speed sensors each located on one of the wheels.

The vehicle 20 may include one or more sensors 76 configured to determine accelerations of the vehicle. For example, the sensors 48 may include a yaw-rate sensor, a lateral-acceleration sensor, a longitudinal-acceleration sensor, a pitch sensor, and a roll sensor. Used herein, "acceleration" refers to both positive acceleration (propulsion) and negative acceleration (braking). The pitch sensor 76 may be used to determine a grade of the road, e.g., if the vehicle is on a hill or flat ground. The pitch may further be used to determine if the vehicle is on an incline (facing uphill) or on a decline (facing downhill). For the purposes of this application, a positive pitch indicates a decline and a negative pitch indicates an incline.

The transmission 12 may include a plurality of modes (also known as ranges) such as PARK, REVERSE, NEUTRAL, and DRIVE. The transmission 22 may be switched between these modes by a gear shifter assembly 80. The shifter assembly 80 may be mounted to a steering column or a console. The gear shifter 80 includes at least PARK, REVERSE, NEUTRAL, and DRIVE positions that correspond with the PARK, REVERSE, NEUTRAL, and DRIVE modes of the transmission, e.g., the transmission is shifted to DRIVE mode in response to the shifter being placed in the DRIVE position. The shifter assembly 80 may include a lever 84 for actuating the gear shifter between the various positions. A driver manually operates the lever 84 and selects a desired mode of the transmission. Many different types of shifter assemblies are now available including rotary and push button. In these embodiments, the transmission is shifted according to dial rotation and button depression as opposed to lever movement.

The shifter assembly 80 may be an electronic shifter (e-shifter) that is electronically connected to the transmission 12 rather than mechanically via a linkage or cable. The gear shifter 80 may be in electronic communication with the transmission 22 via the controller 60. The shifter assembly 80 includes a sensor that is in electronic communication with the controller 60, configured to sense the position the lever 84, rotary dial, button press, etc., and output a signal to the controller indicative of the position. The controller is programmed to receive the position signal and determine the position of the lever 34. The controller is further programmed to command to the transmission 12 to the mode corresponding with the position of the shifter assembly 30. The controller is also programmed to command release of the parking pawl in response to the lever 84 leaving the PARK position.

Figure 2:
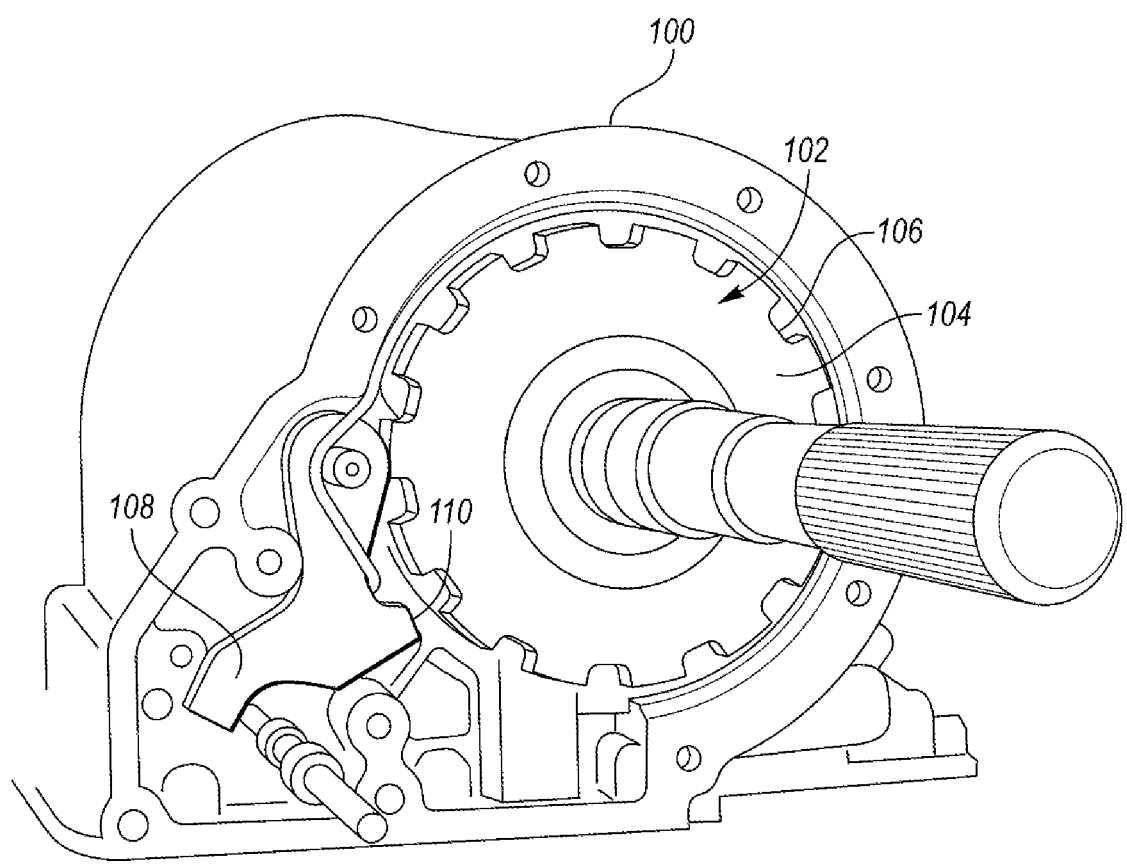
FIG. 2 is a schematic diagram of a transmission showing a parking assembly that places the transmission in PARK.

Referring to FIGS. 1 and 2, the transmission 12 includes a housing or case 100. A parking assembly 102 is disposed in the housing 100 and is configured to rotationally lock the driveshaft 46 to prevent the vehicle 16 from rolling when in the transmission is in PARK. The parking assembly 102 includes a park ring 104, e.g., a gear, that is fixedly coupled to the power flow path of the transmission. For example, the park ring 104 may be attached to or formed on the planetary gear set 26 or any of the gears 40 through 44. The park ring 104 is commonly associated with an output of the transmission. Thus, in one or more embodiments, the park ring 104 may be attached to or formed on the output gear 44. The park ring 104 is annular and defines a plurality of teeth 106 around a circumference of the park ring.

The parking assembly 102 also includes a parking pawl 108 attached to the housing 100 and configured to engage with the park ring 104 to rotationally hold (ground) the park ring 104 relative to the housing 100. This prevents the gearing arrangement within the transmission for rotating and consequently prevents the driveshaft 46 from rotating so that the vehicle 16 does not move when in PARK. The pawl 108 may include a first portion pivotally attached to the housing 100 and a tooth 110 configured to mesh with the teeth 106. The pawl 108 is movable between a disengaged position in which the pawl 108 and ring 104 are disconnected and an engaged position in which the pawl 108 and ring 104 mesh. The pawl 108 is in the engaged position when the transmission is in PARK and otherwise is in the disengaged position. An actuator-and-spring arrangement (not shown) is used to move the parking pawl 108 between the engaged and disengaged positions. The actuator may be a solenoid controlled by the controller. For example, the actuator-spring arrangement is configured to move the pawl 108 to the engaged position in response to the shift lever 84 moving to PARK and move the pawl 108 to the disengaged position in response to the shift lever 84 moving leaving PARK. Many different types of parking assemblies may be used with the transmission 12 and this disclosure is not limited any particular design.

The park ring 104 is fixedly coupled to the wheels 48 as well as the electric machine 18. A group of rotating elements are fixedly coupled to one another if they are constrained to rotate as a unit in all operating conditions. Rotating elements can be fixedly coupled by spline connections, gear mesh, welding, press fitting, machining from a common solid, or other means. Slight variations in rotational displacement between fixedly coupled elements can occur such as displacement due to lash or shaft compliance.

The park ring 104 receives a driveline torque from the wheels 48 when the road has grade. The magnitude of the driveline torque is based the vehicle pitch (which is dependent on the grade of the road). As an absolute value of the pitch increases, the driveline torque increases, and as the absolute value of the pitch decreases, the driveline torque decreases. The direction of the driveline torque depends on if the pitch is an incline or decline. Equations 1, 2, and 3 can be used to calculate driveline torque at the park ring 104 based to pitch.

$$Force_{wheel}(F_w) = [\cos(\text{pitch angle}) \times mass_{vehicle} \times 9.81] \times \frac{\text{Pitch Angle}}{|\text{Pitch Angle}|} \quad \text{(Eq. 1)}$$

$$Torque_{wheel}(T_w) = F_w \times radius_{tire} \quad \text{(Eq. 2)}$$

$$\text{Driveline } Torque_{parking} = (T_w \div \text{gear ratio}) + / - \text{ loss} \quad \text{(Eq. 3)}$$

If the vehicle is on a road with grade, e.g., inclined or declined, a driveline torque will be present at the park ring. That is, the parking pawl 108 will be applying a reaction force at the tooth/teeth interface to prevent rotation of the park ring 104. If the incline or decline is great enough, the friction force between the tooth 110 and the teeth 106 is sufficient to produce detectable noise when the pawl 108 is disengaged with the park ring 104. Drivers may find the noise disconcerting. The vehicle 16 include controls and systems for diminishing the noise to a level unperceivable by the driver.

The noise can be reduced by lowering the reaction force between the tooth 110 and the teeth 106 allowing the pawl 108 to mechanically disconnect from the ring 104 with less force. The force on the pawl 108 can be reduced by applying a torque via the electric machine 18 to counteract driveline torque on the park ring 104. The rotor 19 is fixedly coupled to the park ring 104 and thus the park ring 104 rotates with the rotor 19 albeit at a different speed and torque. The torque and speed of the park ring 104 is equal to the torque and speed of the electric machine 18 multiplied or divided by a gear ratio+/−loss. Equations 4 and 5 can be used to calculate torque and speed at the park ring 104.

$$\text{Counteractive torque}_{park\ ring} = (\text{torque}_{electric\ machine} \times \text{gear ratio}) +/- \text{loss} \quad \text{(Eq. 4)}$$

$$\text{Speed}_{park\ ring} = (\text{Speed}_{electric\ machine} \div \text{gear ratio}) +/- \text{loss} \quad \text{(Eq. 5)}$$

For example, if the vehicle is parked on a hill that creates 100 Newton meters (Nm) of driveline torque at the park ring 104 in a first direction, the electric machine can be commanded to produce a torque that creates a 100 Nm torque at the park ring 104 in a second direction to cancel out the driveline torque. This reduces the friction force between the tooth 110 and the teeth 106 allowing the pawl 108 to mechanically disconnect with less noise. The torque at the park ring 104 produced by the electric machine 18 may be referred to as a counteractive torque, and the torque at the park ring 104 produced by the wheels (road grade) may be referred to as the driveline torque. The counteractive torque may be equal to the driveline torque or may be a lesser value. That is, the counteractive torque required to sufficiently diminish noise may be less than the driveline torque. The counteractive torque should not exceed the driveline torque.

According to one or more embodiments, when crankshaft of the engine and/or the rotor 19 of the electric machine rotate counterclockwise (when viewed from the back of the vehicle 16), driveshaft 46 also rotates counterclockwise to propel the vehicle forward. The vehicle is propelled in reverse by rotating the driveshaft 46 clockwise, which can occur by shifting the transmission to REVERSE and/or rotating the rotor clockwise. Used herein, a first direction or a second direction refers to either clockwise or counterclockwise rotation based on context.

Torque is a vector and includes both a magnitude and a direction. The direction may be determined by the sign of the torque, e.g., + or −. For convention, positive torque is counterclockwise and negative torque is clockwise. Thus, when the vehicle is on an incline (uphill) the driveline asserts a negative torque on the park ring 104 and the counteractive torque is positive, and, when the vehicle is on a decline (downhill) the driveline asserts a positive torque on the park ring 104 and the counteractive torque is negative.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
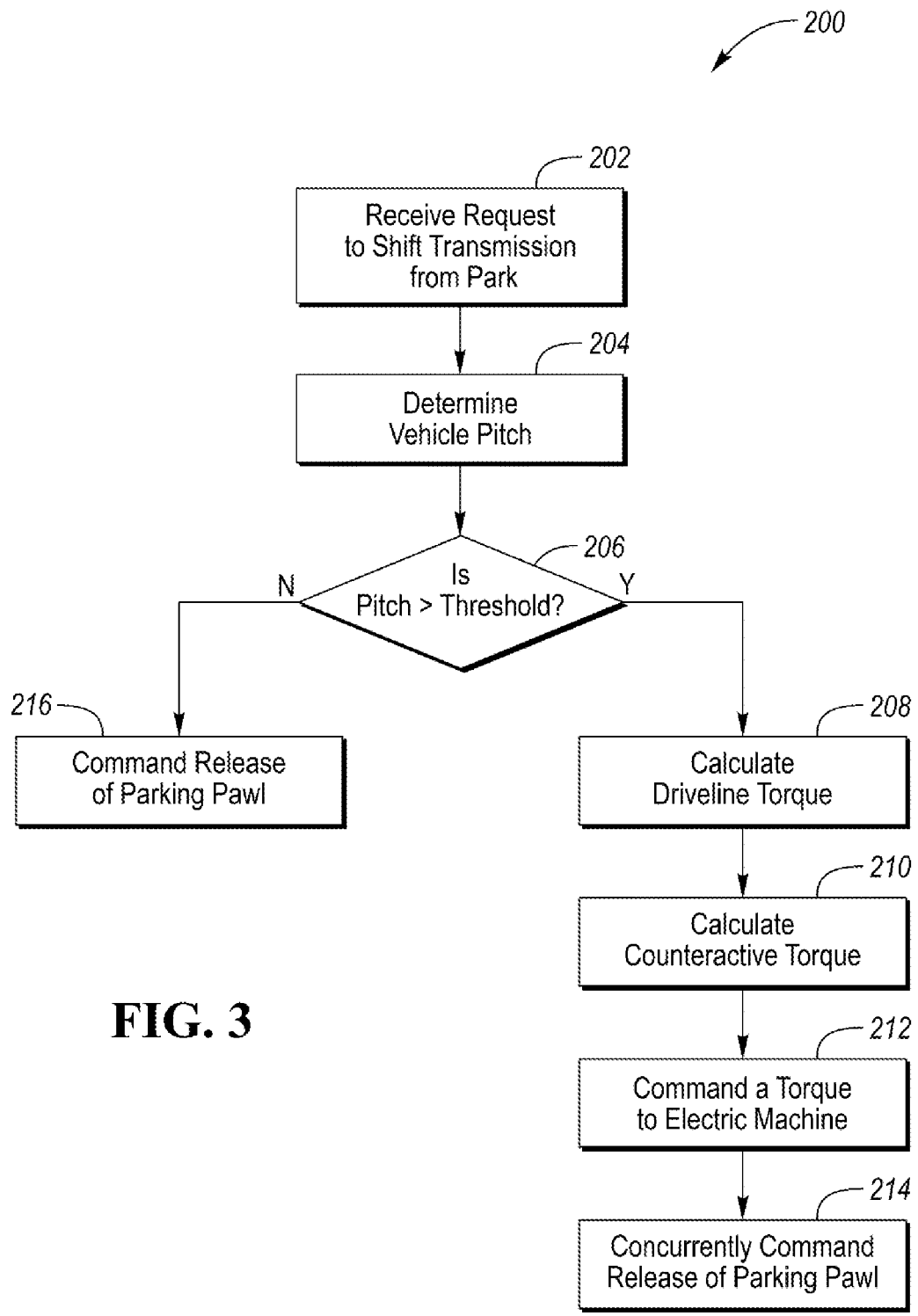
FIG. 3 is a flow chart of an algorithm for shifting a transmission from PARK.

FIG. 3 is a flowchart 200 of an algorithm for shifting the transmission out of PARK. The algorithm begins at operation 202 when a request to shift the transmission from PARK is received. At operation 204, the controller receives a signal from the pitch sensor and determines the pitch of the vehicle. The pitch may be determined as explained above.

At operation 206, the controller determines if the pitch of the vehicle is greater than a threshold. The threshold may be a single threshold that is used for both inclination and declination. That is, an absolute value of the pitch may be compared to the threshold. Alternatively, the vehicle may have an inclination threshold, e.g., a positive value, and a declination threshold, e.g., a negative value. The threshold indicates a pitch that is likely to create excessive noise at the parking pawl during disengagement. The value of the threshold may be determined during vehicle testing and may vary by vehicle.

If the pitch is greater than the threshold, control passes to operation 208 and the controller calculates the driveline torque at the park ring based on the pitch. For example, readings form the pitch sensor and equations 1 through 3 may be used to calculate the driveline torque. At operation 210, the controller calculates a counteractive torque required to cancel out (all or some) of the driveline torque to ensure smooth and quiet disengagement of the parking pawl from the park ring. At operation 212, the controller determines an electric machine torque required to produce the counteractive torque of operation 210 and commands the electric machine to produce that torque. The counteractive torque urges the park ring in a direction opposite the driveline torque to reduce the friction force between the parking pawl and the park ring so that the noise produced during disengagement of the parking pawl is lowered. The controller commands release of the parking pawl while producing electric machine torque to shift out of PARK at operation 214. The controller may send a signal to a solenoid associated with the parking pawl to move the parking pawl to the disengaged position as explained above. To prevent rolling of the vehicle due to the counteractive torque, the friction brakes may be applied when shifting out of PARK. This step is optional.

If the pitch was determined to be below the threshold at operation 206, control passes operation 216 and the parking pawl is released without applying a counteractive torque. Since the pitch of the vehicle is relatively flat, the noise created by disengagement of the parking pawl is acceptable and as such a counteractive torque is not required.

In an alternative embodiment, the pitch threshold may be omitted from the control logic. Here, the controller will apply a counteractive torque every time the vehicle is shifted from PARK.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a transmission including an electric machine, a park ring fixedly coupled to the electric machine, and a parking pawl engageable with the park ring to hold the park ring stationary when the transmission is in PARK; and
   a controller programmed to, responsive to a request to shift from PARK and to a pitch of the vehicle exceeding a threshold, command disengagement of the parking pawl and concurrently command a torque to the electric machine to counteract driveline torque on the park ring.

2. The vehicle of claim 1, wherein the torque command includes a magnitude and direction based on a pitch of the vehicle.

3. The vehicle of claim 2, wherein the direction is a first direction when the pitch indicates inclination of the vehicle and is a second direction when the pitch indicates declination of the vehicle.

4. The vehicle of claim 2, wherein the magnitude increases as an absolute value of the pitch increases.

5. The vehicle of claim 4, wherein the magnitude decreases as the absolute value of the pitch decreases.

6. The vehicle of claim 1 further comprising an accelerometer configured to output a signal indicting pitch of the vehicle, and wherein the torque is based on the pitch.

7. The vehicle of claim 1, wherein the controller is further programmed to apply friction brakes responsive to the request to shift from PARK.

8. The vehicle of claim 1, wherein the transmission further includes a housing, and the parking pawl is attached to the housing and configured to rotationally fix the park ring to the housing.

9. The vehicle of claim 1, wherein the park ring defines a plurality of teeth and the parking pawl includes a tooth configured to mesh with the teeth when the parking pawl is engaged.

10. The vehicle of claim 1, wherein the driveline torque is based on a pitch of the vehicle and on a gear ratio between the park ring and driven wheels of the vehicle.

11. A vehicle comprising:
    a transmission including
    a housing,
    an electric machine disposed in the housing and having a rotor,
    a park ring fixedly coupled to the electric machine such that rotation of the rotor rotates the park gear,
    a parking pawl attached to the housing and configured to engage with the park ring to rotationally fix the park ring to the housing when the transmission is in PARK;
    an accelerometer configured to output a signal indicting pitch of the vehicle; and
    a controller programmed to, responsive to a request to shift the transmission from PARK and the pitch of the vehicle being beyond a threshold, (i) command a torque to the electric machine having a magnitude and a direction based on the pitch and (ii) command disengagement of the parking pawl from the park ring while the torque is applied.

12. The vehicle of claim 11, wherein the direction is a first direction when the pitch indicates inclination of the vehicle and is a second direction when the pitch indicates declination of the vehicle.

13. The vehicle of claim 11, wherein the magnitude increases as an absolute value of the pitch increases.

14. The vehicle of claim 13, wherein the magnitude decreases as the absolute value of the pitch decreases.

15. The vehicle of claim 11, wherein the controller is further programmed to apply friction brakes responsive to the request to shift from PARK.

16. A method of disengaging a parking pawl from a park ring in a transmission having an electric machine, the method comprising:
    responsive to the transmission being shifted from PARK and a pitch of a vehicle exceeding an inclination threshold, concurrently commanding the electric machine to rotate in a first direction with a first torque having a magnitude based on the pitch and disengagement of a parking pawl from the park ring; and
    responsive to the transmission being shifted from PARK and the pitch of the vehicle exceeding a declination threshold, concurrently commanding the electric machine to rotate in a second direction with a second torque having a magnitude based on the pitch and disengagement of the parking pawl from the park ring.

17. The method of claim 16, wherein the magnitude of the first torque increases as an absolute value of the pitch increases, and wherein the magnitude of the first torque decreases as an absolute value of the pitch decreases.

18. The method of claim 17, wherein the magnitude of the second torque increases as an absolute value of the pitch increases, and wherein the magnitude of the second torque decreases as an absolute value of the pitch decreases.

19. The method of claim 16 further comprising applying friction brakes responsive to the request to shift from PARK.

* * * * *